(12) United States Patent
Kang et al.

(10) Patent No.: US 11,674,786 B2
(45) Date of Patent: Jun. 13, 2023

(54) MEASURING TAPE HAVING MAGNETIC BASE ATTACHABLE TO MULTI DIMENSIONAL AXES

(71) Applicant: KOMELON CORPORATION, Busan (KR)

(72) Inventors: Dong Hun Kang, Busan (KR); Nam Hoon Kang, Busan (KR); Seok Jun An, Busan (KR); Baek Cheon Shin, Busan (KR); Bum Hun Park, Busan (KR)

(73) Assignee: KOMELON CORPORATION, Busan (KR)

( * ) Notice: Subject to any disclaimer, the term of this patent is extended or adjusted under 35 U.S.C. 154(b) by 12 days.

(21) Appl. No.: 17/341,137

(22) Filed: Jun. 7, 2021

(65) Prior Publication Data

US 2021/0389110 A1    Dec. 16, 2021

(30) Foreign Application Priority Data

Jun. 10, 2020  (KR) .................. 10-2020-0070605

(51) Int. Cl.
*G01B 3/1048*    (2020.01)
*G01B 3/1071*    (2020.01)

(52) U.S. Cl.
CPC ......... *G01B 3/1048* (2020.01); *G01B 3/1071* (2013.01); *G01B 2003/1074* (2013.01)

(58) Field of Classification Search
None
See application file for complete search history.

(56) References Cited

U.S. PATENT DOCUMENTS

| | | | | | |
|---|---|---|---|---|---|
| 2,535,791 | A | * | 12/1950 | Fluke | G01C 9/00 33/DIG. 1 |
| 2,704,890 | A | * | 3/1955 | Welsch | G01B 5/00 33/DIG. 1 |
| 4,593,475 | A | * | 6/1986 | Mayes | G01C 9/28 33/DIG. 1 |
| 4,924,597 | A | * | 5/1990 | Tursi | G01B 5/0002 33/758 |
| 5,481,813 | A | * | 1/1996 | Templeton | G01B 3/1071 33/770 |

(Continued)

FOREIGN PATENT DOCUMENTS

| | | | | |
|---|---|---|---|---|
| DE | 102005051554 A1 | * | 5/2007 | .......... G01B 3/1084 |
| JP | 2006242661 | | 9/2006 | |

(Continued)

*Primary Examiner* — Christopher W Fulton
(74) *Attorney, Agent, or Firm* — Kunzler Bean & Adamson (57) ABSTRACT

Disclosed is a measuring tape which includes a housing, a reel received in the housing, and a blade wound on an outer surface of the reel and withdrawn or restored from an entrance of the housing, wherein the housing includes a base which adheres to an outside by using a magnetic force, a first receiving groove providing at least a pair of first lower boundaries parallel to a first direction in which the blade is withdrawn and a second receiving groove providing at least a pair of second lower boundaries parallel with a second direction crossing the first direction are formed on a bottom of the base, and the base is able to be fixed in a two-axis direction with respect to a curved structure by using the first lower boundaries or the second lower boundaries.

19 Claims, 9 Drawing Sheets

(56) References Cited

U.S. PATENT DOCUMENTS

| | | | | |
|---|---|---|---|---|
| 6,029,360 A * | 2/2000 | Koch | ................. | G01C 9/28 33/381 |
| 6,082,017 A * | 7/2000 | Simar | ................. | G01B 3/1071 33/DIG. 1 |
| 6,173,502 B1 * | 1/2001 | Scarborough | ............ | G01C 9/28 33/DIG. 1 |
| 6,568,095 B2 * | 5/2003 | Snyder | ................. | G01C 9/28 33/DIG. 1 |
| 7,117,606 B2 * | 10/2006 | Brown | ................. | G01C 9/28 33/DIG. 1 |
| 7,152,335 B2 * | 12/2006 | Nichols | ................. | G01C 9/18 33/DIG. 1 |
| 8,468,710 B1 * | 6/2013 | Mos | ................. | G01B 3/1084 33/668 |
| 2022/0178669 A1 * | 6/2022 | Shipley | ................. | G01B 3/1048 |

FOREIGN PATENT DOCUMENTS

| | | |
|---|---|---|
| JP | 2012021910 | 2/2012 |
| KR | 200216412 | 12/2000 |
| KR | 2020180005076 | 11/2018 |
| WO | WO-2020205821 A1 * | 10/2020 |

* cited by examiner

MEASURING TAPE HAVING MAGNETIC BASE ATTACHABLE TO MULTI DIMENSIONAL AXES

CROSS-REFERENCE TO RELATED APPLICATIONS

This application claims the priority of Korean Patent Application No. 10-2020-0070605 filed on Jun. 10, 2020, in the Korean Intellectual Property Office, the disclosure of which is incorporated herein by reference.

BACKGROUND OF THE INVENTION

Field of the Invention

The present invention relates to a measuring tape, and more particularly, to a measuring tape having a magnetic base attachable to multi dimensional axes.

Description of the Related Art

A general measuring tape includes a housing, a reel elastically supported inside the housing, a blade wound on the reel in a coil form, and an end hook coupled to an end of the blade. A user withdraws the blade from an end to which the end hook is coupled for measurement and withdraws the blade by a desired length to measure a length or distance of an object to be measured.

Further, the elastically operating reel includes a clockwork spring and a bobbin receiving the clockwork spring and is provided in a state in which the blade is wound on an outer surface of the bobbin and withdrawn to the housing, and the blade withdrawn by a restoring force of the clockwork spring may return in a winding direction on the bobbin.

A brake may be included to maintain a withdrawn state of the blade. In general, the brake includes a button exposed to the outside of the housing, and may temporarily stop the return of the blade or release the stopped blade through an operation of pressing the button.

In Japanese Patent Publication No. 2006-242661 (published on Sep. 14, 2006), there is disclosed a measuring tape with a magnet mounted on a bottom, but in the corresponding measuring tape, since the magnet is the plane, an approaching force is included, but there is no resistance to a rotating force.

In Korean Utility Model Registration No. 20-0216412 (issued on Dec. 30, 2000), there is disclosed a measuring tape with a magnet installed on a bottom. Even in this measuring tape, only a planar magnet is included to adhere to a flat bottom, but a fixed position may not be maintained in a pipe forming a scaffold.

The above-described technical configuration is the background art for helping in the understanding of the present invention, and does not mean a conventional technology widely known in the art to which the present invention pertains.

SUMMARY OF THE INVENTION

An object of the present invention is to provide a measuring tape having a magnetic base attachable to multi dimensional axes capable of being easily attached even to a structure using a pipe such as a scaffold, etc.

Particularly, an object of the present invention is to provide a measuring tape having a magnetic base attachable to multi dimensional axes capable of stably fixing the measuring tape even in not only a longitudinal direction of a pipe but also another direction vertical or inclined thereto.

According to an exemplary embodiment of the present invention to achieve the objects of the present invention, there is provided a measuring tape having a magnetic base attachable to multi dimensional axes which includes a housing, a reel received in the housing, and a blade wound on an outer surface of the reel and withdrawn or restored from an entrance of the housing, wherein the housing includes a base that adheres to an outside by using a magnetic force, a first receiving groove providing at least a pair of first lower boundaries parallel to a first direction in which the blade is withdrawn and a second receiving groove providing at least a pair of second lower boundaries parallel with a second direction crossing the first direction are formed on a bottom of the base, and the base is able to be fixed in a two-axis direction with respect to a curved structure by using the first lower boundaries or the second lower boundaries.

Generally, a circular pipe is used for scaffolding, staging, and greenhouse works, etc. having many high place operations, and a conventional measuring tape having a planar magnet can not be stably fixed to the circular pipe.

In the embodiment, it is possible to provide the adhesion between the magnet and the pipe by using at least a pair of lower boundaries formed in parallel with two directions other than the overall plane. Further, the first direction and the second direction cross each other, preferably, are vertical to each other, so that the measuring tape is able to be fixed in the two directions.

For reference, in the embodiment, the expression of ordinals such as first and second is assumed as a plurality of others other than two, and the expression of the ordinal of the second is not necessarily meant to only two.

Accordingly, in the measuring tape having the magnetic base attachable to multi dimensional axes of the present invention, lower boundaries formed in a plurality of directions may be included and thus, the measuring tape is able to be fixed even in n directions of two or more.

Specifically, the first receiving groove of the base may be provided with a first yoke having a staple shape and a first magnet adhering to the first yoke, and ends of both bridges bent vertically to the first yoke may form the first lower boundaries. Here, the first magnet may be formed in a rectangular shape, and the first yoke may be provided in a stapler pin cartridge shape and bent in a C-lettered shape.

Similarly, the second receiving groove may be provided with a second yoke having a staple shape and a second magnet adhering to the second yoke, and ends of both bridges bent vertically to the second yoke may form the second lower boundaries. Preferably, the first yoke and the second yoke are disposed in a perpendicular direction to each other to fix the measuring tape to the circular pipe in the first direction by using the first yoke and the first magnet and fix the measuring tape vertically to the circular pipe in the second direction by using the second yoke and the second magnet.

The second lower boundary may be formed higher than the first lower boundary, and in this case, when the longitudinal direction of the circular pipe coincides with the first direction, the interference by the second lower boundary of the second yoke may be minimized.

In addition, engraved boundaries having an arc, quadrangular, or polygonal shape may be formed at left and right ends of the second receiving groove forming the second lower boundaries and at left and right ends spaced apart from each other in the second direction of the base. A curvature of the arc-shaped engraved boundary may correspond to the curvature of the circular pipe, which is mainly mounted, and since the circular pipe is targeted, it may be useful that the curvature of the engraved boundary is formed with the same curvature. In addition, the quadrangular or polygonal engraved boundary may also be formed in the same shape.

The second receiving groove may be located adjacent to the entrance of the housing as compared with the first receiving groove and relatively, the first receiving groove may be located at the back of the housing. Nevertheless, the second receiving groove is located at the center of the housing to maintain the stable adhesion when the second receiving groove is fixed vertically to the pipe.

Structurally, it may be advantageous that the second receiving groove is located at the center of the housing so as to be located at a position overlapping vertically with the center of the reel in plane.

The lower end of the front part of the housing where the entrance of the housing is formed may be located higher than the first lower boundary. While the measuring tape adheres to the bottom or the circular pipe, the lower end of the front part of the housing and the lower end of the hook are highly positioned from the ground to prevent the hook or the blade from being damaged in a restoring process of the blade or the hook.

According to an exemplary embodiment of the present invention to achieve the objects of the present invention, there is provided a measuring tape including a housing, a reel received in the housing, and a blade which is wound on an outer surface of the reel to be withdrawn or restored from an entrance of the housing, wherein the housing includes a base that adheres to the outside by using a magnetic force, a first receiving groove is formed on the bottom of the base to provide at least a pair of first lower boundaries in parallel with a first direction in which the blade is withdrawn, and engraved boundaries having an arc, quadrangular or polygonal shape may be formed on the first lower boundaries to be spaced apart from each other in a second direction crossing the first direction, respectively. Thus, the base may fix the measuring tape in a two-axis direction with respect to a curved structure by using the first lower boundaries or the engraved boundaries. The engraved boundaries may be formed in arc, elliptic, quadrangular, and polygonal shapes to adhere to outer surfaces of circular, elliptic, quadrangular, and polygonal pillars.

The first receiving groove may be provided with a first yoke having a staple shape and a first magnet adhering to the first yoke, and ends of both bridges bent vertically to the first yoke may form the first lower boundaries, and the engraved boundaries may be concavely formed at the ends of the both bridges of the first yoke.

A length B of the first lower boundary may be formed as 0.3 to 1.2 of a length D of the housing, and a width A of the first lower boundary may be formed as 0.4 to 1.2 of a width C of the housing.

Accordingly, since the concavely engraved boundary is formed on the first lower boundary, the first lower boundary adheres to the circular pipe so as to adhere to only a part other than the entire length of the circular pipe. The engraved boundary is approximately located at the center of the first lower boundary to prevent the measuring tape from being unstably inclined forward or backward.

When analyzing this structurally, when a front distance Lf to the front end of the first lower boundary from a center of the engraved boundary and a rear distance Lr to the rear end of the first lower boundary from the center of the engraved boundary are defined, it may be advantageous that the front distance Lf has the range of 0.1 to 1.0 of the housing length L, the rear distance Lr has the range of 0.1 to 1.0 of the housing length L, and a sum Lf+Lr of the front distance Lf and the rear distance Lr has the range of 0.3 to 1.2 of the housing length L.

When analyzing this structurally, when the front distance Lf to the front end of the first lower boundary from the center of the engraved boundary and the rear distance Lr to the rear end of the first lower boundary from the center of the engraved boundary are defined, the front distance Lf may have the range of 0.1 to 1.0 of the housing length L or the rear distance Lr may have the range of 0.1 to 1.0 of the housing length L.

The length excluding the engraved boundary from the length of the first yoke may be 5% or more of the first yoke length.

A height h of the engraved boundary may be variously determined, and in the engraved boundary for a curved surface of the first yoke, a distance h spaced apart from the lower boundary in a y-axis direction, that is, a height direction may have the following range.

$$0.8 < \frac{h}{r - \sqrt{r^2 - (L_c/2)^2}} < \frac{Yh}{r - \sqrt{r^2 - (L_c/2)^2}}$$

Wherein, r may be a curvature radius of the engraved boundary, Lc may be a length in the first direction of the engraved boundary, and Yh may be a height of the yoke.

A width Lc of the engraved boundary for the sum Lf+Lr of the front distance Lf and the rear distance Lr may be formed to have the range of 0.15 to 0.75. When the width Lc of the engraved boundary is smaller than 0.15*(Lf+Lr), a coupling force by the first lower boundary is too strong, so that it is difficult to separate the measuring tape from the pipe, and a portion adhering in the second direction is relatively small, so that the fixation may be unstable in the second direction.

On the contrary, when the width Lc of the engraved boundary is larger than 0.75*(Lf+Lr), the coupling force by the first lower boundary is weakened so that the fixation to the pipe in the first direction may be unstable, and the portion adhering in the second direction is relatively increased so that it is difficult to separate the measuring tape in the second direction.

It may be preferred that the front distance Lf is equal to or smaller than the rear distance Lr, and it may be advantageous that the engraved boundary is approximately located at the center of the measuring tape. When expressing this numerically, a distance $d_0$ to a center $C_0$ of the engraved boundary in the first direction to a center $R_0$ of the reel may be maintained within 10% of the length L of the housing to stably form the coupling force in the second direction.

A center point of the first yoke may be within 0.7 (70%) of the length L of the housing from the central axis of the reel.

A lower end Lv. 3 of the front part of the housing where the entrance of the housing is formed may be located higher than the first lower boundary Lv. 1.

The measuring tape having the magnetic base attachable to multi dimensional axes of the present invention may be easily attached even to a structure using a pipe such as a scaffold, etc. and may be stably fixed by selecting two or more directions.

Further, the coupling force is formed by using a magnet to properly adjust the mutual combination of the first lower boundaries, the second lower boundaries, thereby adjusting the excessive coupling force and forming entirely stable coupling of the base.

Further, when the measuring tape is held, the receiving groove or the engrave boundary is naturally in contact with fingers, thereby providing a relatively comfortable grip feeling even if the size is slightly larger than that of a conventional measuring tape due to an additional magnet base.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings, but the present invention is not limited or restricted to the embodiments. For reference, in the description, like reference numerals substantially refer to like elements, which may be described by citing contents disclosed in other drawings under such a rule and contents determined to be apparent to those skilled in the art or repeated may be omitted.

Figure 1:
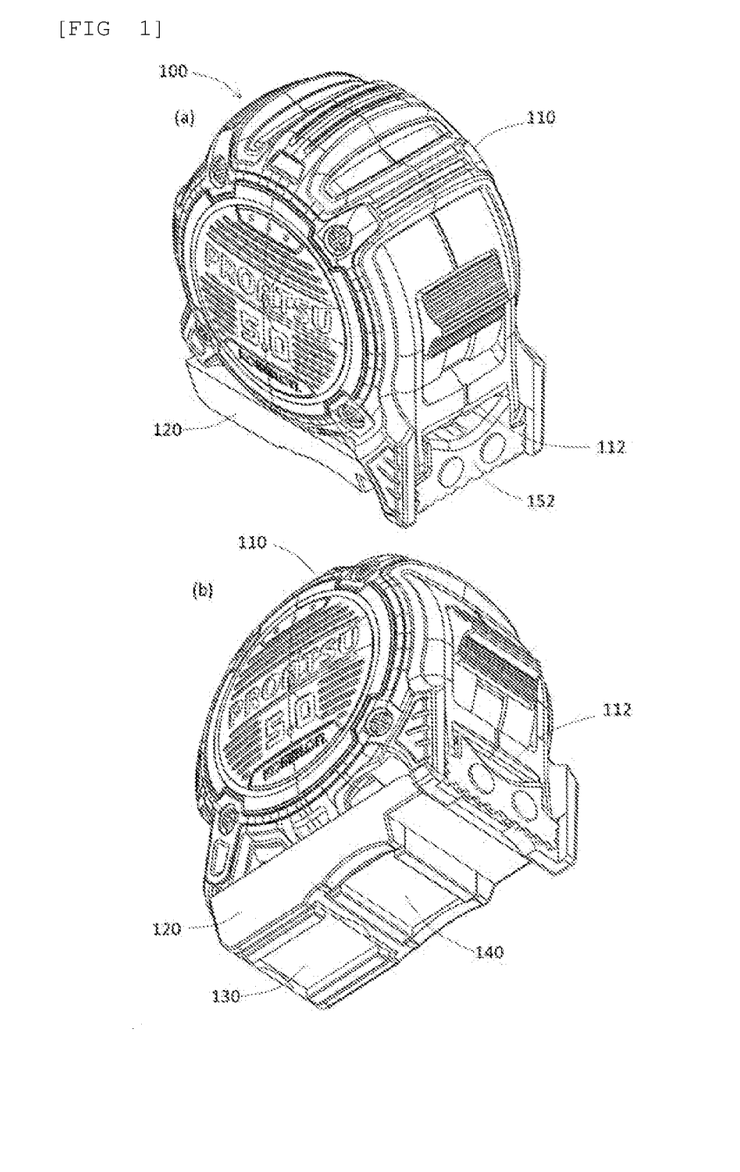
FIGS. 1a and 1b are perspective views for describing a measuring tape having a magnetic base attachable to multi dimensional axes according to an embodiment of the present invention.
Figure 2:
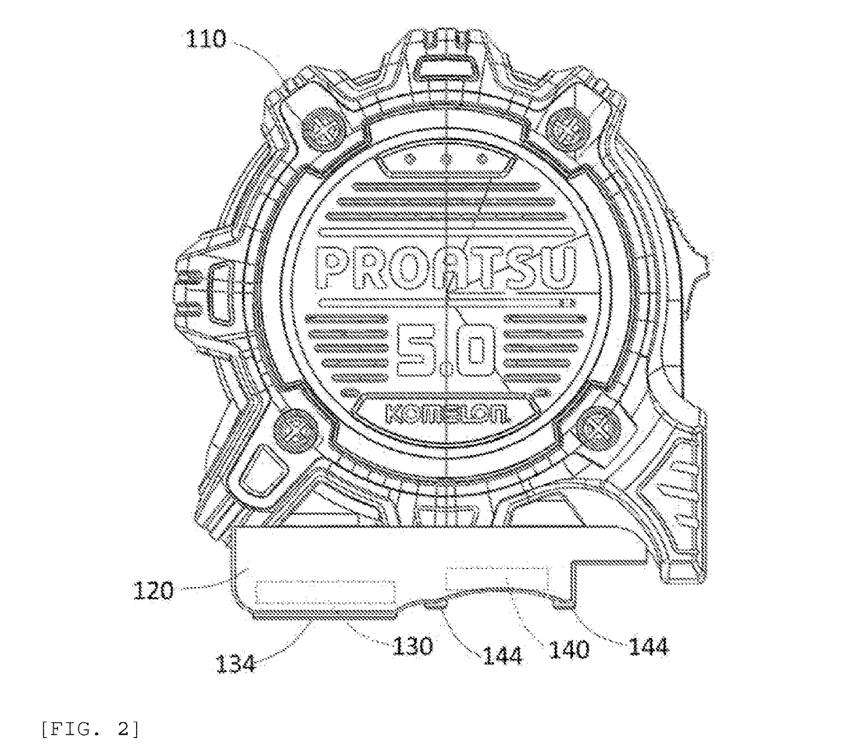
FIG. 2 is a lateral view of the measuring tape having the magnetic base attachable to multi dimensional axes of FIGS. 1a and 1b.
Figure 3:
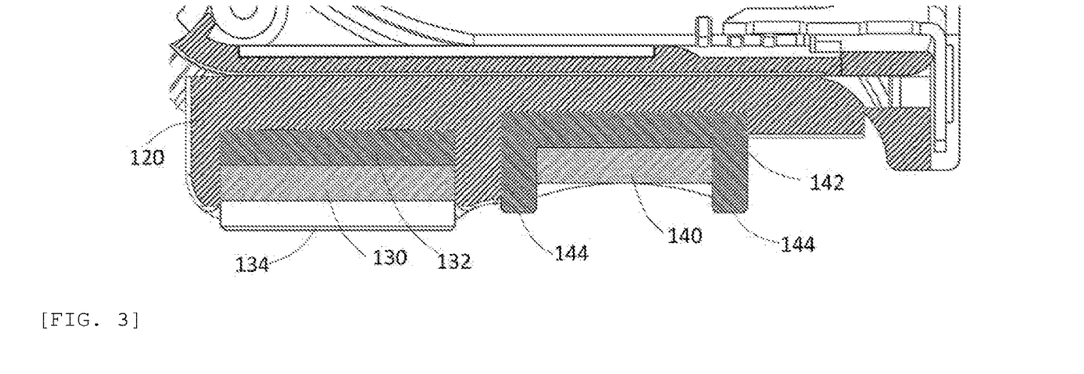
FIG. 3 is a cross-sectional view for describing a lower part of the measuring tape having the magnetic base attachable to multi dimensional axes of FIGS. 1a and 1b.
Figure 4:
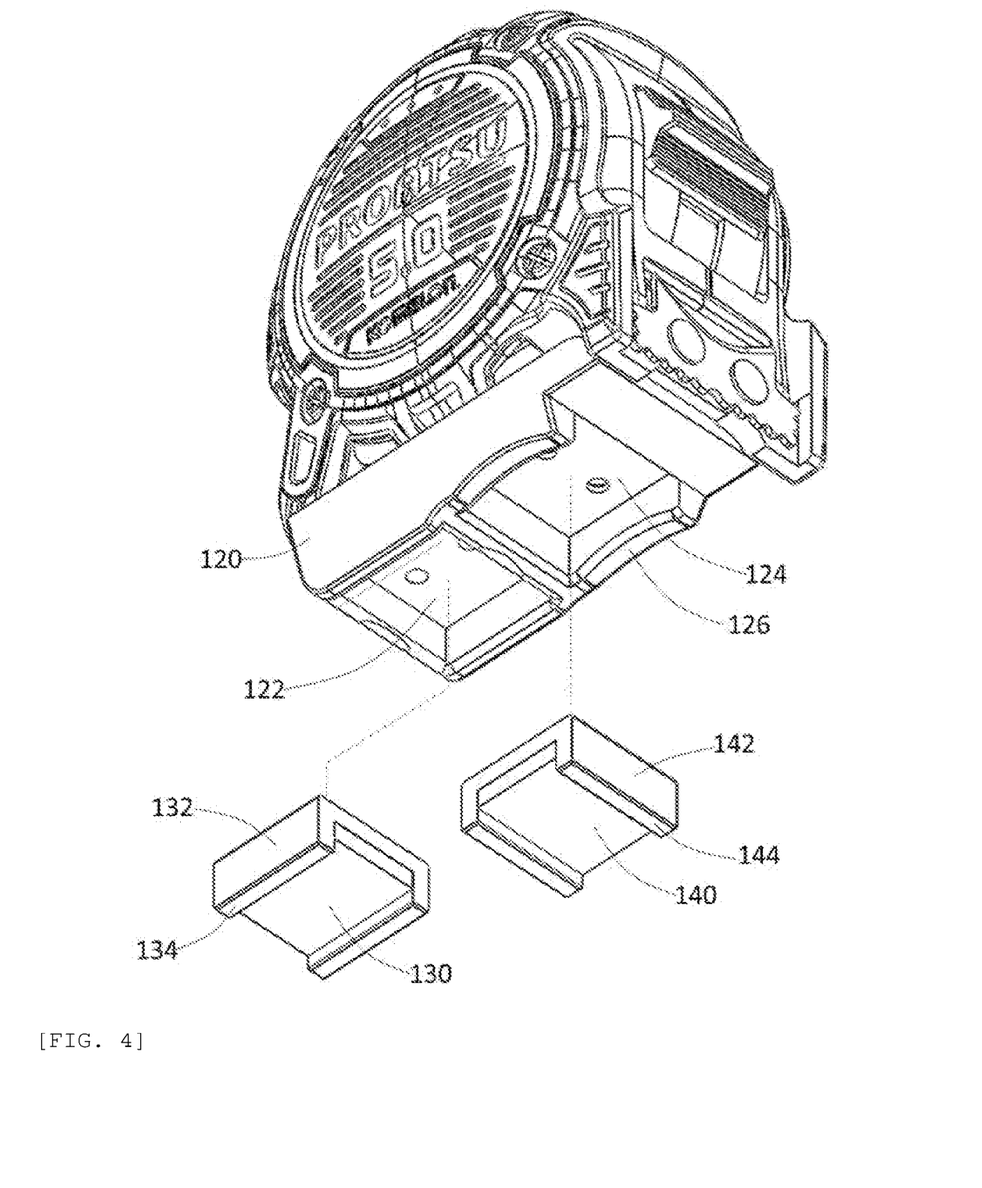
FIG. 4 is a bottom exploded view for describing a base coupling structure of the measuring tape having the magnetic base attachable to multi dimensional axes of FIGS. 1a and 1b.

FIGS. 1a and 1b are perspective views for describing a measuring tape having a magnetic base attachable to multi dimensional axes according to an embodiment of the present invention, FIG. 2 is a lateral view of the measuring tape having the magnetic base attachable to multi dimensional axes of FIGS. 1a and 1b, FIG. 3 is a cross-sectional view for describing a lower part of the measuring tape having the magnetic base attachable to multi dimensional axes of FIGS. 1a and 1b, and FIG. 4 is a bottom exploded view for describing a base coupling structure of the measuring tape having the magnetic base attachable to multi dimensional axes of FIGS. 1a and 1b.

Referring to FIGS. 1a to 4, a measuring tape 100 according to the embodiment includes a housing 110, a reel received in the housing 110, a blade which is wound on an outer surface of the reel and withdrawn or restored from an entrance 112 of the housing 110, and a hook 152 coupled to an outer end of the blade.

The housing 110 may be formed by a first case and a second case which are horizontally coupled to each other and the reel may be received into the housing based on a rotational shaft connecting the first case and the second case. Although not illustrated, the reel may include a bobbin on which the blade is wound and a spring received in the bobbin. The bobbin and the spring may refer to a structure of other existing measuring tapes.

Figure 6:
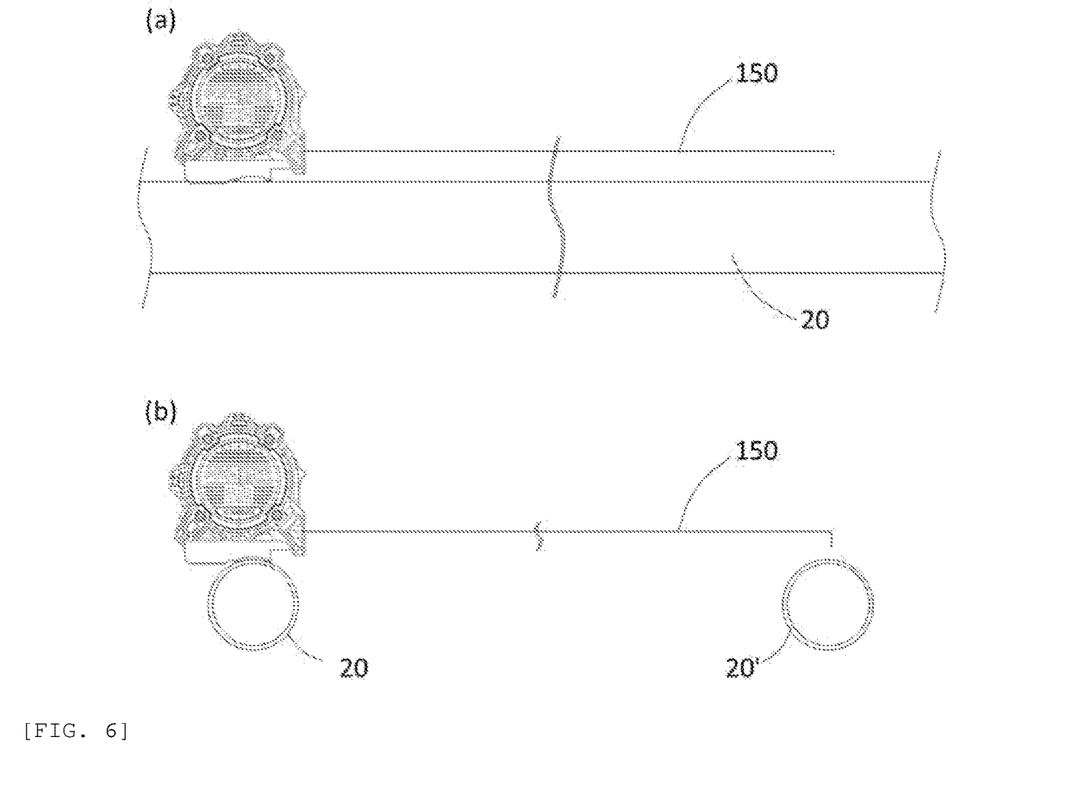
FIGS. 6a and 6b are lateral views for describing a process of using the measuring tape having the magnetic base attachable to multi dimensional axes according to an embodiment of the present invention while being fixed to the circular pipe.

As an example, the spring may be provided in a clockwork shape, wherein an inner end may be fixed to the rotational shaft of the reel and an outer end may be fixed to an end of the blade. Accordingly, the spring may continuously provide a force for winding the blade, and as illustrated in FIGS. 6a and 6b, the blade 150 withdrawn to the outside of the housing 110 may return to the inside through the entrance 112 of the housing to be wound on the outer surface of the reel.

The measuring tape 100 may include the blade capable of measuring 3.5 m, 5.5 m, and the like, depending on a measurable maximum length, and may be provided in various types depending on a material, a width, or the like of the blade.

The lower part of the housing 110 may include a base 120 that adheres to the outside by using a magnetic force, and a first receiving groove 122 and a second receiving groove 124 may be formed on the bottom of the base 120.

The first receiving groove 122 may be provided with a first yoke 132 having a staple shape or a C-lettered shape and a first magnet 130 adhering to the first yoke 132. Ends of both bridges bent vertically to the first yoke 132 protrude to the outside of the first receiving groove 122 to form first lower boundaries 134 which are substantially coupled with the pipe, and the like. The first magnet 130 is formed in a rectangular shape and coupled to the inner side of the first yoke 132 while three surfaces thereof are surrounded by the first yoke 132, but in some cases, the magnet may be provided to adhere to only the upper surface of the first yoke. Further, the first yoke 132 may be provided to be bent in a stapler pin cartridge shape or a C-lettered shape.

Similarly, the second receiving groove 124 may also be provided with a second yoke 142 having a staple shape or a C-lettered shape and a second magnet 140 adhering to the second yoke 142. Ends of both bridges bent vertically to the second yoke 142 protrude to the outside of the second receiving groove 124 to form second lower boundaries 144 which are substantially coupled with the pipe, and the like. However, the first yoke 132 and the second yoke 142 are disposed in a perpendicular direction to each other to fix the measuring tape 100 to the circular pipe, and the like in the first direction by using the first yoke 132 and the first magnet 130 and also fix the measuring tape 100 vertically to the circular pipe in the second direction by using the second yoke 142 and the second magnet 140.

For reference, in the embodiment, the first receiving groove 122 and the second receiving groove 124 are disclosed, but in another embodiment, three or more receiving grooves may also be formed.

Figure 5:
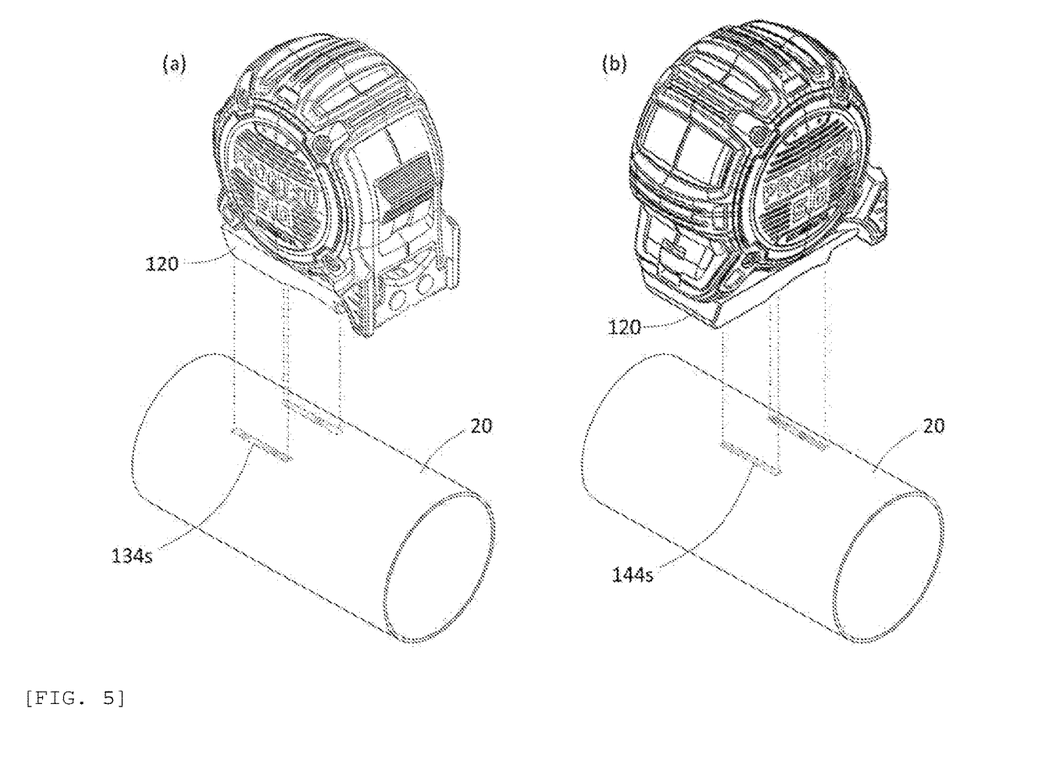
FIGS. 5a and 5b are perspective views illustrating a process of fixing the measuring tape having the magnetic base attachable to multi dimensional axes to a circular pipe according to an embodiment of the present invention.

FIGS. 5a and 5b are perspective views illustrating a process of fixing the measuring tape having the magnetic base attachable to multi dimensional axes to a circular pipe according to an embodiment of the present invention and FIGS. 6a and 6b are lateral views for describing a process of using the measuring tape having the magnetic base attachable to multi dimensional axes according to an embodiment of the present invention while being fixed to the circular pipe.

Referring to FIG. 5a, the measuring tape may be fixed in parallel in a longitudinal direction of the circular pipe 20 by using the first yoke 132 and the first magnet 130 of the first receiving groove 122. In this case, the first lower boundaries defined by the first yoke 132 of the base 120 may form a first coupling line 134s disposed in parallel in a longitudinal direction on an upper surface of the circular pipe 20 as projected in FIG. 5a.

Referring to FIG. 5b, the measuring tape may be fixed vertically to the longitudinal direction of the circular pipe 20 by using the second yoke 142 and the second magnet 140 of the first receiving groove 124. Even in this case, the second lower boundaries defined by the second yoke 142 of the base 120 may form a second coupling line 144s disposed in parallel in a longitudinal direction on the upper surface of the circular pipe 20 as projected in FIG. 5b.

As a result, it is possible to use the coupling lines 134s and 144s disposed in parallel in the longitudinal direction, that is, by selecting the direction, instead of adhering to the entire area in the longitudinal direction of the circular pipe 20.

Referring to FIG. 6a, the measuring tape is fixed to one side of the circular pipe 20 in the longitudinal direction even by a worker alone and may be usefully used to measure the length in the longitudinal direction of the circular pipe 20 by using the hook and the blade 150.

As illustrated in FIG. 6b, the measuring tape is fixed vertically to the circular pipe 20 and may be usefully used to measure an interval between the pipes 20 and 20' or measure a distance between the pipe and a surrounding structure.

Figure 7:
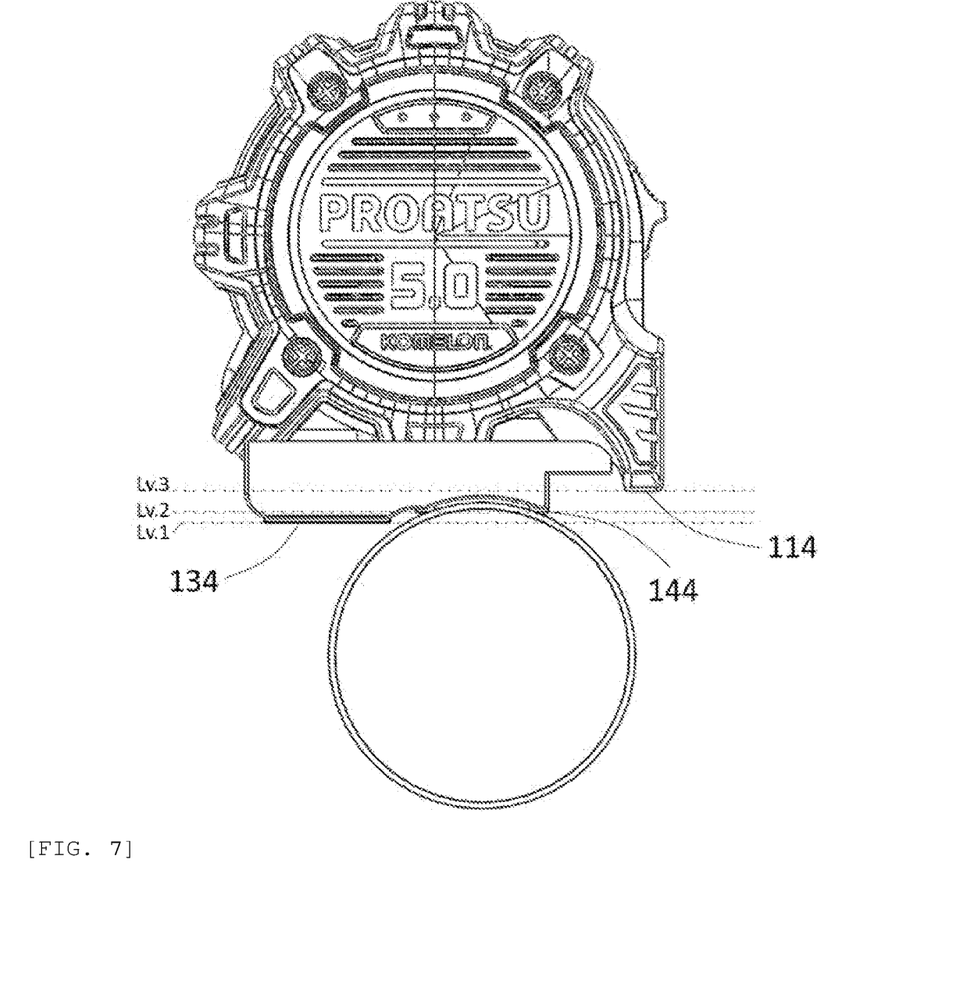
FIG. 7 is a lateral view for describing a relationship between lower boundaries of the measuring tape having the magnetic base attachable to multi dimensional axes according to an embodiment of the present invention.

FIG. 7 is a side view for describing a relationship between lower boundaries of the measuring tape having the magnetic base attachable to multi dimensional axes according to an embodiment of the present invention.

The measuring tape is fixed vertically to the circular pipe by using the second receiving groove. Even in scaffolding, staging, and greenhouse works, etc. having many high place operations, the measuring tape may be stably fixed even in any direction.

Referring to FIG. 7, a position Lv. 2 of the second lower boundary 144 may be higher than a position Lv. 1 of the first lower boundary 134. In this case, when the longitudinal direction of the circular pipe coincides with the first direction, it is possible to prevent the circular pipe 20 from interfering with a certain approach to the first magnet 130 by the second lower boundaries 144 of the second yoke 142.

Further, preferably, the bottom of the first magnet 130 and the second lower boundaries 144 are located approximately at the same height. As a result, when the circular pipe 20 is coupled in a direction coinciding with the first direction, in the first receiving groove 122, the coupling force between the first yoke 132 and the upper surface of the circular pipe 20 may be maintained and simultaneously, the second lower boundaries 144 of the second yoke 142 may also adhere to the top of the circular pipe 20 by a magnetic force.

In this case, the measuring tape maintains the coupling force with respect to almost a total length of the base 120 and is supported even in the front of the base 120 by the second yoke 142 to prevent the measuring tape from being inclined forward.

Further, as illustrated in FIGS. 4 and 7, arc-shaped engraved boundaries 126 may be formed at left and right ends of the second receiving groove 124 forming the second lower boundaries 144 and left and right ends spaced apart from each other in the second direction of the base.

The curvature of the engraved boundary 126 may correspond to be almost the same as the curvature of the circular pipe 20, which is mainly mounted, and may be used for a scaffold, staging, or the like using the standard circular pipe 20. Since the circular pipe 20 is targeted, it may be useful that the curvature of the engraved boundary 126 is also formed with the same curvature.

Referring to FIG. 4, the second receiving groove 124 may be located adjacent to the entrance 112 of the housing as compared with the first receiving groove 122 and relatively, the first receiving groove 122 may be located at the back of the housing 110. Nevertheless, the second receiving groove 124 is located at the center of the housing 110 to maintain the stable adhesion when the second receiving groove 124 is fixed vertically to the pipe.

Structurally, as illustrated in FIG. 2, it may be advantageous that the second receiving groove 124 is located at the center of the housing so as to be located at a position overlapping vertically with the center of the reel in plane.

Further, a position Lv. 3 of the lower end 114 of the front part where the entrance 112 of the housing 110 is located may be formed higher than the position Lv. 1 of the first lower boundary 134. While the measuring tape adheres to the bottom or the circular pipe, the lower end 114 of the front part of the housing 110 and the lower end of the hook are highly positioned from the ground to prevent the hook or the blade from being damaged or highly bounding by colliding with the bottom or the pipe in a rapid restoring process of the blade or the hook.

Figure 8:
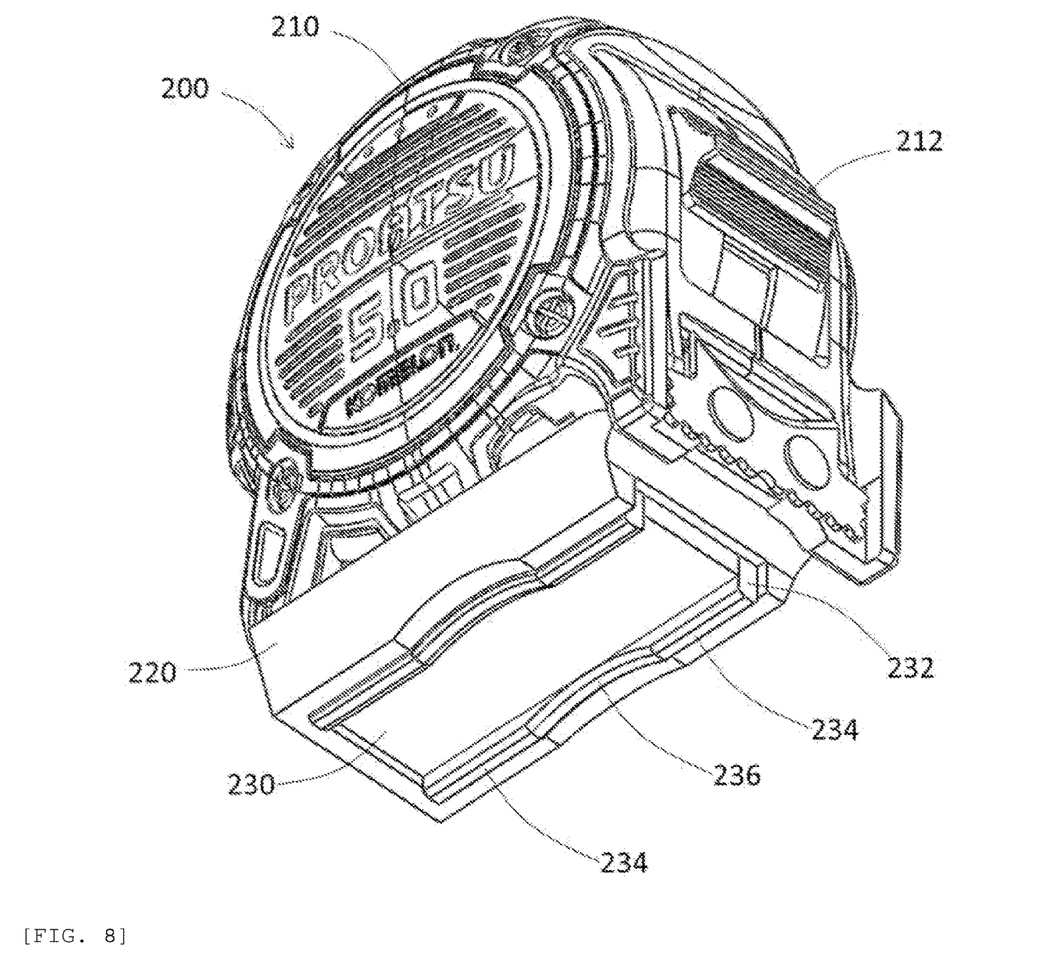
FIG. 8 is a bottom perspective view for describing a lower structure of the measuring tape having the magnetic base attachable to multi dimensional axes according to an embodiment of the present invention.
Figure 9:
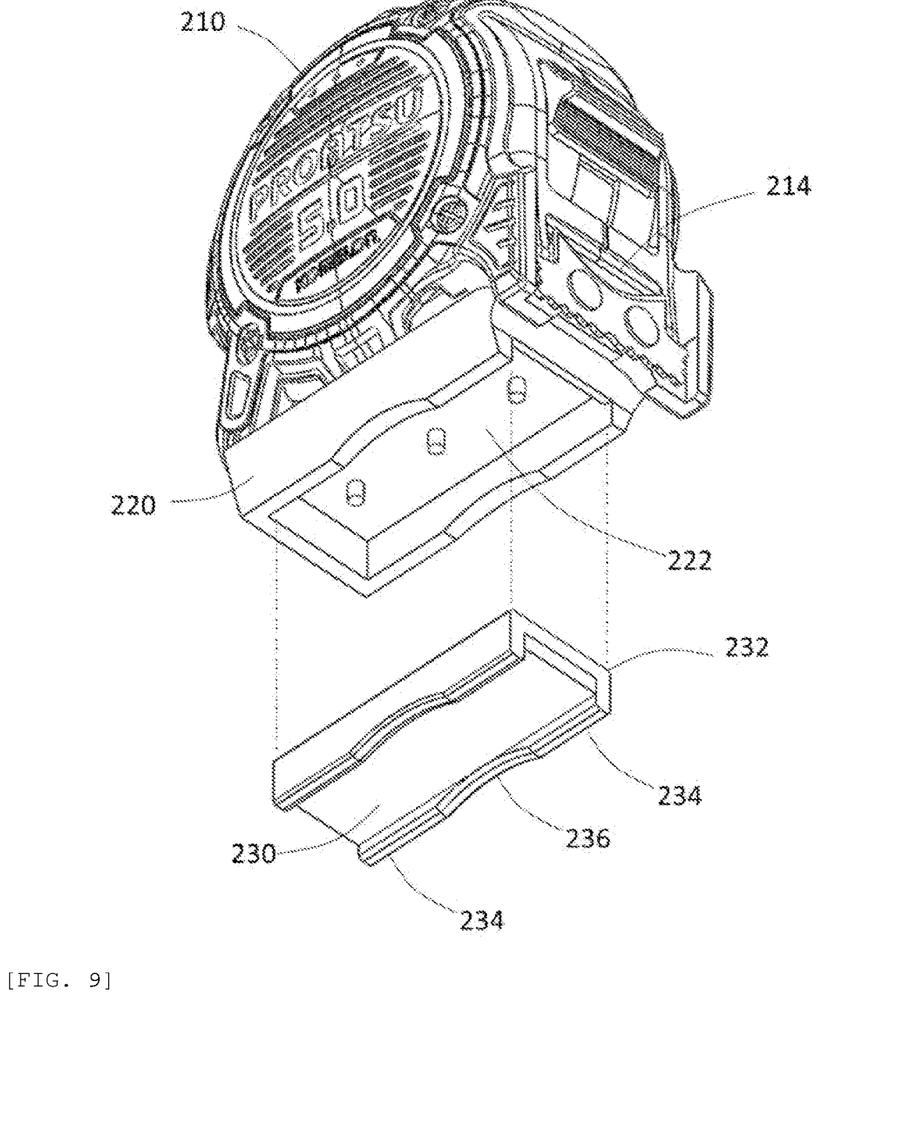
FIG. 9 is an exploded perspective view for describing a coupling structure of the base of the measuring tape having the magnetic base attachable to multi dimensional axes of FIG. 8.
Figure 10:
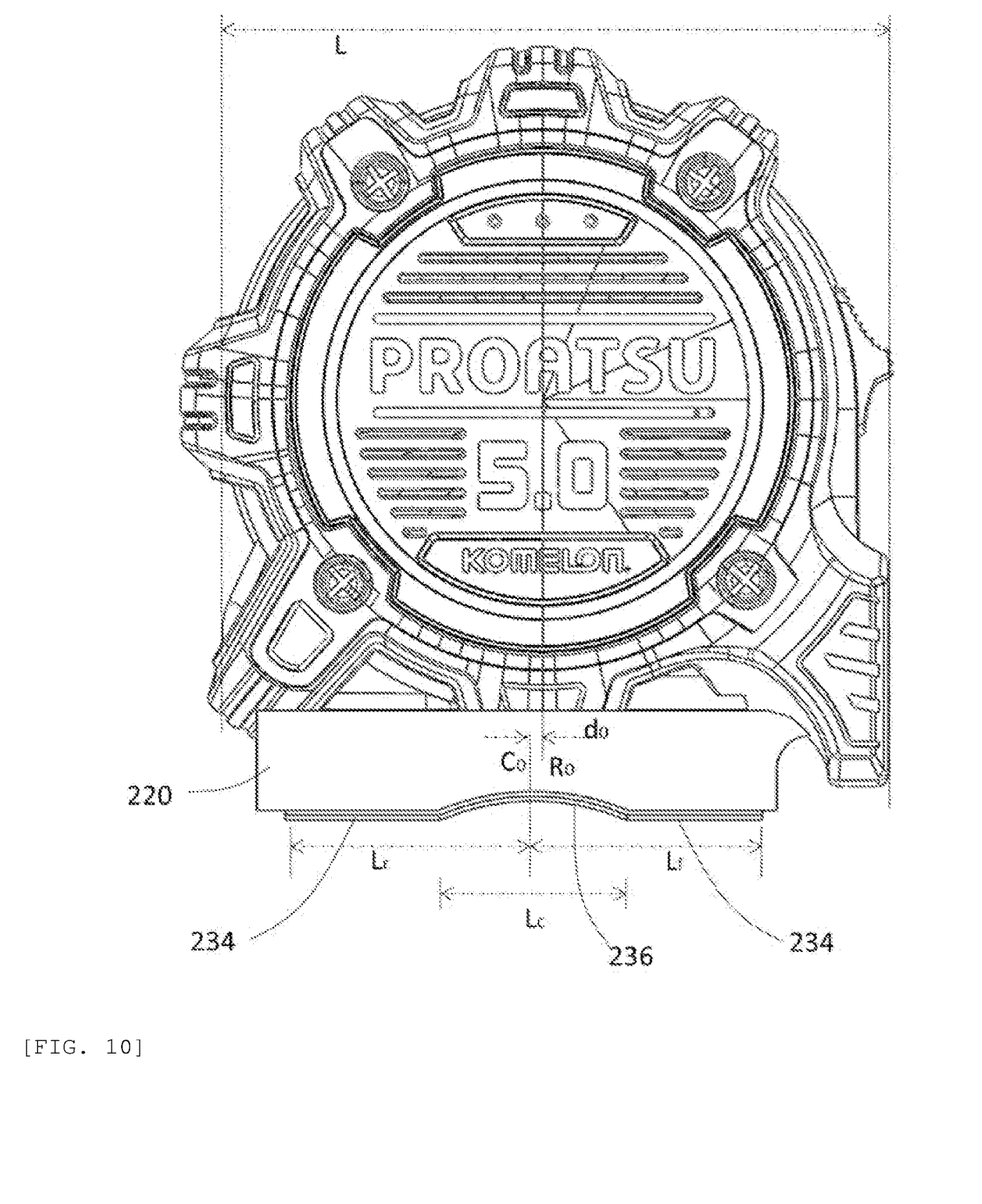
FIG. 10 is a lateral view for describing dimension optimization of the measuring tape having the magnetic base attachable to multi dimensional axes of FIG. 2.

FIG. 8 is a bottom perspective view for describing a lower structure of the measuring tape having the magnetic base attachable to multi dimensional axes according to an embodiment of the present invention, FIG. 9 is an exploded perspective view for describing a coupling structure of the base of the measuring tape having the magnetic base attachable to multi dimensional axes of FIG. 8, and FIG. 10 is a lateral view for describing dimension optimization of the measuring tape having the magnetic base attachable to multi dimensional axes of FIG. 2.

Referring to FIGS. 8 to 10, the measuring tape according to the embodiment includes a housing 210, a reel received in the housing 210, a blade which is wound on an outer surface of the reel and withdrawn or restored from an entrance 212 of the housing 210, and a hook coupled to an outer end of the blade, and a basic structure may refer to the previous embodiment.

In the embodiment, the lower portion of the housing 210 may include a base 220 that adheres to the outside by using a magnetic force, and one first receiving groove 222 may be formed on the bottom of the base 220.

The first receiving groove 222 may be provided with a first yoke 232 which has a staple shape or a C-lettered shape and is elongated in response to the entire length of the base 220 and a first magnet 230 adhering to the upper surface inside the first yoke 232. Ends of both bridges bent vertically to the first yoke 232 protrude to the outside of the first receiving groove 222 to form first lower boundaries 234 which are substantially coupled with the pipe, and the like and engraved boundaries 236 as engraved boundaries located at the center thereof. The first magnet 230 is formed in a rectangular shape corresponding to the length of the first yoke 232 and is coupled into the first yoke 232 while three surfaces are surrounded by the first yoke 232.

The measuring tape may be fixed in parallel in a longitudinal direction of the circular pipe 20 by using the first yoke 232 and the first magnet 230 of the first receiving groove 222. Further, the measuring tape may be fixed vertically in the longitudinal direction of the circular pipe 20 by using the engraved boundaries 236 formed concavely on the first lower boundaries 234.

The first lower boundary 234 may be formed longer than 0.3 of a housing length L from a front end where the entrance 212 of the housing 210 is located to a rear end of the housing to maintain the stable adhesion. Here, the front end and the rear end of the housing 210 may be understood as a region substantially defining the housing except for a decorative element, and in some cases, may be understood as a horizontal distance to the farthest position of the housing based on the entrance of the housing.

In addition, the first lower boundary 234 of the base 220 may be formed shorter than 1.2 of the housing length L. The reason is that if the first lower boundary 234 is too long, rather, it may be difficult to separate the measuring tape.

Accordingly, since the concavely engraved boundary 236 is formed on the first lower boundary 234, the first lower boundaries 234 adhere to the circular pipe so as to adhere to only a part other than the entire length of the circular pipe. In addition, as illustrated in FIG. 10, the engraved boundary 236 is approximately located at the center of the first lower boundary 234 to prevent the measuring tape from being unstably inclined forward or backward.

Specifically, a distance to the front end of the first lower boundary 234 from a center $C_0$ of the engraved boundary 236 may be defined as a front distance Lf and a distance to the rear end of the first lower boundary 234 from the center Co of the engraved boundary 236 may be defined as a rear distance Lr.

Here, the front distance Lf may be formed in the range of about 10 to 100%, that is, 0.1 to 1.0 of the housing length L. Further, it may be advantageous that the rear distance Lr has the range of about 0.1 to 1.0 of the housing length L, and a sum Lf+Lr of the front distance Lf and the rear distance Lr has the range of about 0.3 to 1.2 of the housing length L.

A width Lc of the engraved boundary for the sum Lf+Lr of the front distance Lf and the rear distance Lr may be formed to have the range of about 0.15 to 0.75. When the width Lc of the engraved boundary 236 is smaller than 0.15*(Lf+Lr), a magnetic force by the first lower boundary 234 is too strong, so that it is difficult to separate the measuring tape from the pipe and a portion adhering through the engraved boundary 236 is relatively small, so that the fixation may be unstable in the second direction.

On the contrary, when the width Lc of the engraved boundary 236 is larger than 0.75*(Lf+Lr), the coupling force by the first lower boundary 234 is weakened so that the fixation to the pipe in the first direction may be unstable, and the portion adhering through the engraved boundary 236 is relatively increased so that it is difficult to separate the measuring tape in the second direction.

It may be preferred that the front distance Lf is equal to or smaller than the rear distance Lr, and it may be advantageous that the engraved boundary 236 is approximately located at the center of the measuring tape. When expressing this numerically, a horizontal distance $d_0$ to the center Co of the engraved boundary in the first direction to a center $R_0$ of the reel may be within 70% of the length L of the housing. Preferably, the housing length L may be maintained within 10% to stably form the coupling force in the second direction.

A depth h of the engraved boundary defined as the distance between the center $C_0$ of the engraved boundary and the first lower boundary may be defined according to the following Equation.

$$0.8 < \frac{h}{r - \sqrt{r^2 - (L_c/2)^2}} < \frac{Yh}{r - \sqrt{r^2 - (L_c/2)^2}}$$

Wherein, r may be a curvature radius of the engraved boundary 236, Lc may be a length in the first direction of the engraved boundary 236, and Yh may be a height of the yoke.

Referring to FIG. 10, the position of the lower end of the front part where the entrance 212 of the housing 210 is located may be formed higher than the position of the first lower boundary 234. While the measuring tape adheres to the bottom or the circular pipe, the lower end of the front part of the housing 210 and the lower end of the hook are highly positioned from the ground to prevent the hook or the blade from being damaged or highly bounding by colliding with the bottom or the pipe in a rapid restoring process of the blade or the hook.

As described above, the present invention has been described with reference to the preferred embodiments thereof, but it will be appreciated by those skilled in the art that various modifications and changes of the present invention can be made without departing from the spirit and the scope of the present invention which are defined in the appended claims.

What is claimed is:

1. A measuring tape having a magnetic base attachable to multi dimensional axes which comprises a housing, a reel received in the housing, and a blade wound on an outer surface of the reel and withdrawn or restored from an entrance of the housing, wherein
the housing includes a base that adheres to an outside by using a magnetic force, a first receiving groove providing at least a pair of first lower boundaries parallel to a first direction in which the blade is withdrawn and a second receiving groove providing at least a pair of second lower boundaries parallel with a second direction crossing the first direction are formed on a bottom of the base, and
the base is able to be fixed in a two-axis direction with respect to a curved structure by using the first lower boundaries or the second lower boundaries.

2. The measuring tape having a magnetic base attachable to multi dimensional axes of claim 1, wherein the first receiving groove is provided with a first yoke having a staple shape and a first magnet adhering to the first yoke, and the first lower boundaries are formed along ends of both bridges bent vertically to the first yoke, and
the second receiving groove is provided with a second yoke having a staple shape and a second magnet adhering to the second yoke, and the second lower boundaries are formed along ends of both bridges bent vertically to the second yoke.

3. The measuring tape having a magnetic base attachable to multi dimensional axes of claim 1, wherein the second lower boundary is formed higher than the first lower boundary.

4. The measuring tape having a magnetic base attachable to multi dimensional axes of claim 1, wherein engraved boundaries having an arc, quadrangular, or polygonal shape are formed at left and right ends of the second receiving groove forming the second lower boundaries.

5. The measuring tape having a magnetic base attachable to multi dimensional axes of claim 1, wherein the engraved boundaries to be spaced are formed in the same shape.

6. The measuring tape having a magnetic base attachable to multi dimensional axes of claim 1, wherein the second receiving groove is located adjacent to the entrance of the housing as compared with the first receiving groove.

7. The measuring tape having a magnetic base attachable to multi dimensional axes of claim 1, wherein the second receiving groove is located at the center of the housing so as to be located at a position overlapping vertically with the center of the reel.

8. The measuring tape having a magnetic base attachable to multi dimensional axes of claim 1, wherein the lower end of the front part of the housing where the entrance of the housing is formed is located higher than the first lower boundaries.

9. A measuring tape having a magnetic base attachable to multi dimensional axes which comprises a housing, a reel received in the housing, and a blade wound on an outer surface of the reel and withdrawn or restored from an entrance of the housing, wherein
the housing includes a base that adheres to the outside by using a magnetic force, a first receiving groove is formed on the bottom of the base to provide at least a pair of first lower boundaries in parallel with a first direction in which the blade is withdrawn, and
at least a pair of engraved boundaries are formed on the first lower boundaries to be spaced apart from each other in a second direction crossing the first direction, respectively, and the base is able to be fixed in a two-axis direction with respect to a curved structure by using the first lower boundaries or the engraved boundaries.

10. The measuring tape having a magnetic base attachable to multi dimensional axes of claim 9, wherein the first receiving groove is provided with a first yoke having a staple shape and a first magnet adhering to the first yoke, and ends of both bridges bent vertically to the first yoke form the first lower boundaries, and
the engraved boundaries are concavely formed at the ends of the both bridges of the first yoke.

11. The measuring tape having a magnetic base attachable to multi dimensional axes of claim 9, wherein a length of the first lower boundary is 0.3 to 1.2 of a housing length (L) from a front end where the entrance of the housing is located to a rear end of the housing.

12. The measuring tape having a magnetic base attachable to multi dimensional axes of claim 9, wherein a width between the pair of first lower boundaries is formed as 40 to 120% of a maximum width of the housing.

13. The measuring tape having a magnetic base attachable to multi dimensional axes of claim 11, wherein when a front distance (Lf) to the front end of the first lower boundary from a center of the engraved boundary and a rear distance (Lr) to the rear end of the first lower boundary from the center of the engraved boundary are defined, and
the front distance (Lf) has the range of 0.1 to 1.0 of the housing length (L), the rear distance (Lr) has the range of 0.1 to 1.0 of the housing length (L), and a sum (Lf+Lr) of the front distance (Lf) and the rear distance (Lr) has the range of 0.3 to 1.2 of the housing length (L).

14. The measuring tape having a magnetic base attachable to multi dimensional axes of claim 13, wherein a width (Lc) of the engraved boundary with respect to the sum (Lf+Lr) of the front distance (Lf) and the rear distance (Lr) has the range of 0.15 to 0.75.

15. The measuring tape having a magnetic base attachable to multi dimensional axes of claim 13, wherein a center point (Co) of the engraved boundary is within 0.7 of the length (L) of the housing from the central axis of the reel in the first direction.

16. The measuring tape having a magnetic base attachable to multi dimensional axes of claim 11, wherein a height (h) of the engraved boundary defined as the distance between the center of the engraved boundary and the first lower boundary is defined according to the following Equation, $$0.8 < \frac{h}{r - \sqrt{r^2 - (L_c/2)^2}} < \frac{Yh}{r - \sqrt{r^2 - (L_c/2)^2}}$$

wherein, r is a curvature radius of the engraved boundary, Lc is a length in the first direction of the engraved boundary, and Yh is a height of the yoke.

17. The measuring tape having a magnetic base attachable to multi dimensional axes of claim 9, wherein the lower end of the front part of the housing where the entrance of the housing is formed is located higher than the first lower boundaries.

18. The measuring tape having a magnetic base attachable to multi dimensional axes of claim 9, wherein the engraved boundaries are formed in an arc, elliptic, quadrangular, or polygonal shape.

19. The measuring tape having a magnetic base attachable to multi dimensional axes of claim 9, wherein the engraved boundaries are formed at a height equal to or lower than the bottom of the magnet attached to the base.

* * * * *